Figure 1:
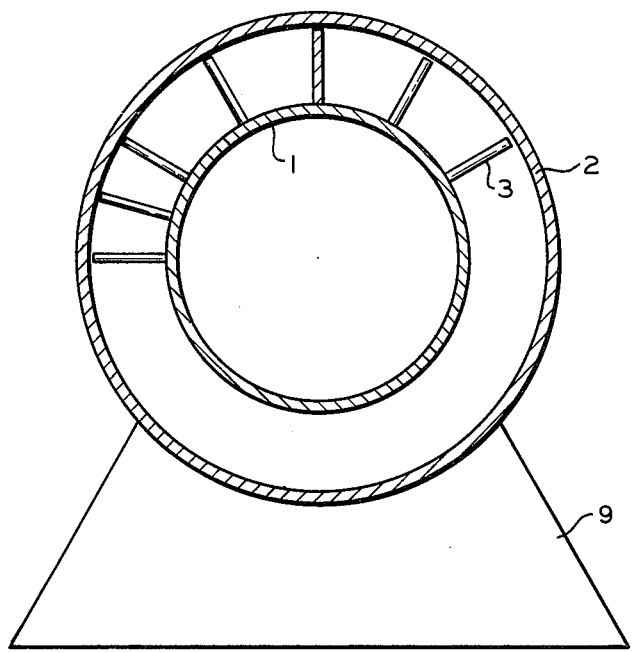

United States Patent [19]

Geissler et al.

[11] 4,166,722
[45] Sep. 4, 1979

[54] PINNED SHAFT AND CARBON BLACK PELLETER

[75] Inventors: Bernhard H. Geissler; Paul D. Hann, both of Bartlesville, Okla.

[73] Assignee: Phillips Petroleum Company, Bartlesville, Okla.

[21] Appl. No.: 849,683

[22] Filed: Nov. 8, 1977

[51] Int. Cl.² .................... B01J 2/10; C01B 31/14
[52] U.S. Cl. .................... 23/314; 264/117; 366/319; 425/222
[58] Field of Search .................... 23/314; 264/117; 425/222; 366/303, 318, 319, 325, 341

[56] References Cited

U.S. PATENT DOCUMENTS

| | | | |
|---|---|---|---|
| 2,288,087 | 6/1942 | Hanson et al. | 23/314 X |
| 3,460,195 | 8/1969 | Erickson | 264/117 X |
| 3,674,437 | 7/1972 | Austin et al. | 23/314 X |
| 3,825,233 | 7/1974 | Henderson | 425/222 X |
| 4,065,240 | 12/1977 | Cole | 425/222 |

Primary Examiner—Morris O. Wolk
Assistant Examiner—Roger F. Phillips

[57] ABSTRACT

A pinned shaft and correspondingly a pinned shell are described having the pins attached to the cylindrical surfaces in such a manner that all of the pins are arranged in a geometrically symmetrical pattern of squares or equilateral triangles or equilateral hexagons with the further provision that the pins are not arranged along straight lines or on circles. By this arrangement of pins a very uniform action of the pins is achieved, the pin density being constant over the entire pinned shaft and the distance between adjacent pins being identical all over the pinned shell. A carbon black pelleting device incorporating such a pinned shaft.

10 Claims, 6 Drawing Figures

PINNED SHAFT AND CARBON BLACK PELLETER

The present invention relates to a pinned shaft or respectively a pinned shell. More specifically, the present invention relates to a carbon black pelleting device incorporating such a pinned shaft.

BACKGROUND OF THE INVENTION

Various arrangements of pins on shafts for mixing devices, e.g. for carbon black pelleters, have been proposed. Many of these pinned shafts have the pins arranged in comblike and/or disclike patterns. A comblike pattern is one wherein the pins extending radially from the shaft surface are arranged in a small number (e.g. four) of imaginary planes which are passed through the longitudinal axis of the shaft, and contain the longitudinal axis of the shaft. A disclike pattern is one wherein the radially extending pins are all arranged in a pattern of a small number (e.g. six) of circles, or, in other words, which radial extending pins lie in the same imaginary plane which is passed perpendicularly to the longitudinal axis of the shaft. These arrangements of the pins have disadvantages. Particularly, the comblike structure with even a very few combs causes surging of the drive mechanism for the pin shaft when operated in a horizontally arranged housing. The disc structure concentrates the pin action in a few areas with essentially no pin action between these locations along the axis or with changing intensities of the pin action.

Another arrangement of pins on a shaft has been proposed wherein the pins are arranged on a so-called defective helix having varying pitch. Whereas this arrangement achieves more uniform pin distribution, the pins are still not arranged in completely identical patterns so that the pin density varies slightly across the shaft. The distance between the pins and their next neighbors is not constant in this embodiment of a pinned shaft. Furthermore, the method to produce such a pinned shaft involves a demanding procedure.

The Invention

It is one object of this invention to provide a new pinned shaft useful for mixing devices.

Another object of this invention is to provide a pinned shaft with the distance between the neighboring pins being constant all over the pinned shaft.

A further object of this invention is to provide a pinned shell having a cylindrical interior provided with pins extending essentially radially inwardly.

Yet another object of this invention is to provide a carbon black pelleter.

Still another object of this invention is to provide a process for making a new pinned shaft or internally pinned shell.

Figure 2:
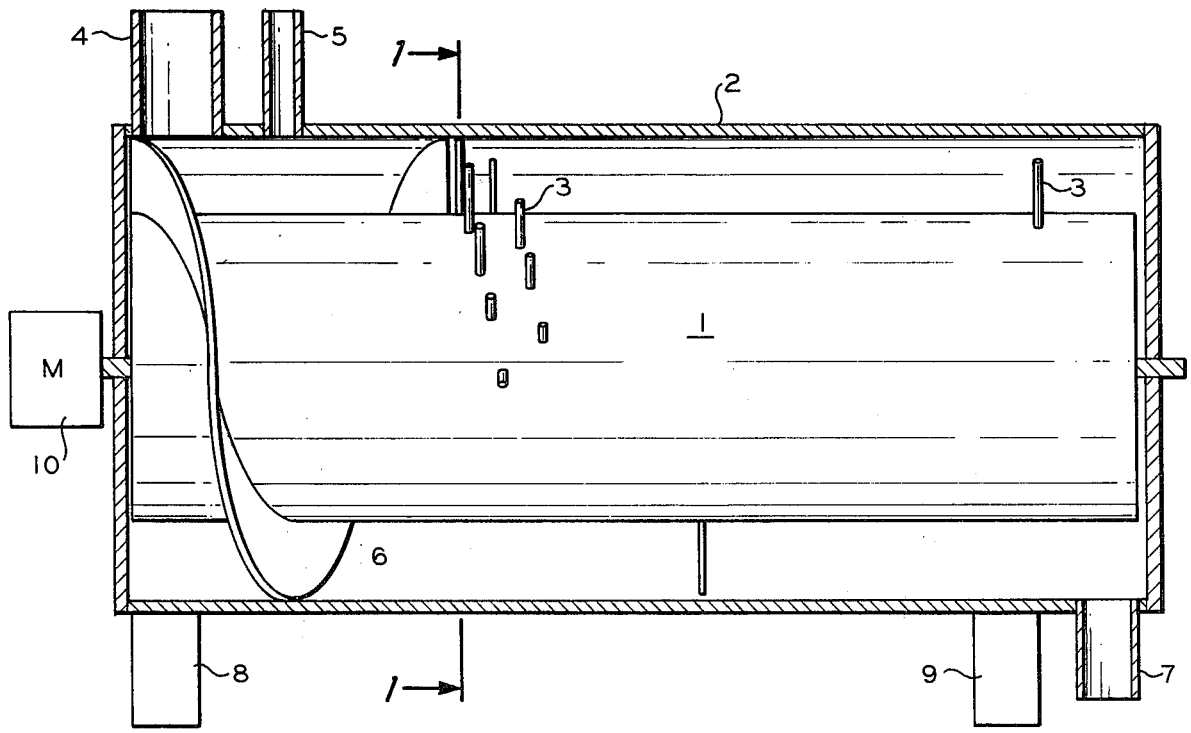
Figure 3:
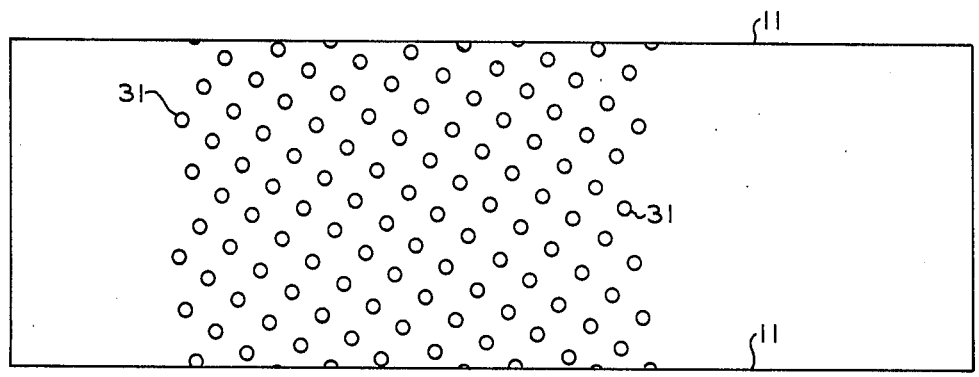
Figure 4:
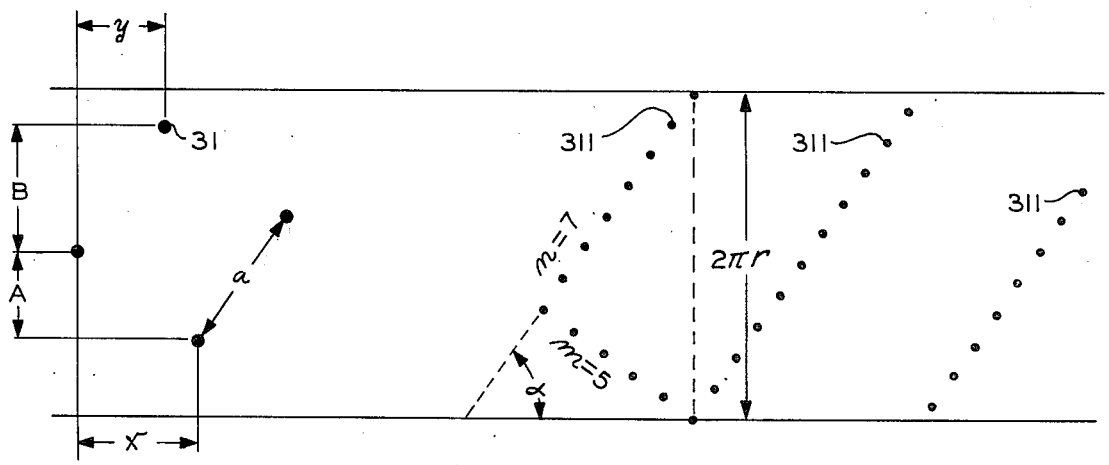
Figure 5:
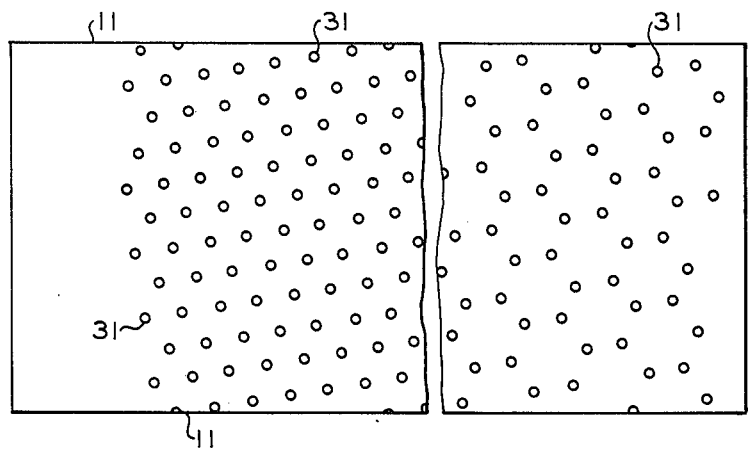
Figure 6:
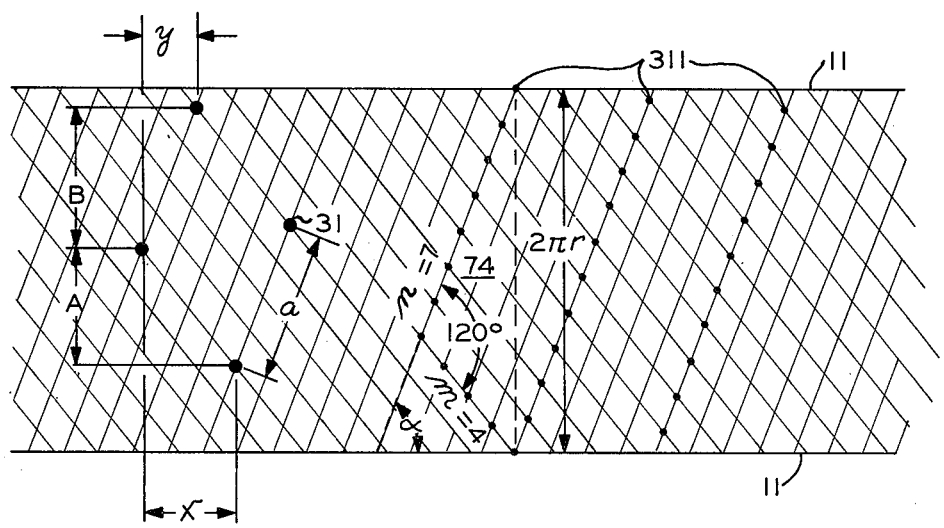

These and other objects, advantages, details, features and embodiments of this invention will become apparent to those skilled in the art from the following detailed description of the invention, the attached claims and the drawing in which FIGS. 1 and 2 show two views of a carbon black pelleter partially in cross section, FIGS. 3 and 4 show the patterns of the pin geometry rolled into a plane with a square pattern, FIGS. 5 and 6 show the preferred patterns of the pin geometry rolled into a plane with a pattern of equilateral triangles.

In accordance with this invention, we have now found that it is possible to arrange pins extending outwardly from a cylindrical shaft or inwardly from a cylindrical shell in a pattern so that the pin traces on an imaginary cylinder (with the cylinder rolled into a plane) are arranged in identically repeating units selected from the group of equilateral triangles, squares and equilateral hexagons, and at the same time avoiding essentially the arrangement of pins in comblike or disclike structures. The repeating units cover the entire area where pin traces are present.

For the following description of preferred embodiments of the invention as well as for the discussion of the geometry of the pin arrangement, the following terms will be used.

The pin geometry will be described with respect to a "imaginary cylinder". Such a cylinder is defined to be coaxial with the shaft or shell and to have a radius such that the pins intersect the imaginary cylinder. The terms "point" or "centerpoint" define the intersection between the pin and the imaginary cylinder, e.g. the intersection of the pin axis and the cylindrical surface of the imaginary cylinder. The pins are arranged in the space around a cylinder but the geometry will be described in terms of the imaginary cylinder, defined above, rolled into a plane. The points or centerpoints in accordance with this invention are located in a pattern of equilateral triangles or in a pattern of squares or in a pattern of equilateral hexagons as shown in some more detail in the drawings.

The important feature in accordance with this invention is that the imaginary cylinder when cut along a line parallel to its axis and rolled into a plane is defined by two parallel border lines that are not parallel to any side of the equilateral triangle, square or equilateral hexagon. These two border lines are also not parallel to any diagonal of the square or equilateral hexagon. Therefore, the pins are not arranged in either comblike or disclike patterns. The radius "r" of the imaginary cylinder and the length of the side "a" of the equilateral triangle, square or equilateral hexagon can therefore not be varied and chosen independently. Once either r or a has been chosen, the other can only assume discrete values; the mathematical relationship will be described in detail later.

The pin geometry is one in which the pins are arranged along one or more helices with the smallest distance a between adjacent pins on the helix on the imaginary cylinder. Generally, the number of helices will not be larger than five, with a single, double or a triple helix being the preferred group.

Although the distance between the closest points on the imaginary cylinder (measured in the plane or on the cylinder surface) can be varied in broad ranges, it is presently preferred that this distance is at least about 0.2 times the radius of the imaginary cylinder.

In accordance with another embodiment of this invention, a pinned shell is provided for which comprises a shell having a cylindrical internal surface and pins extending radially inwardly from this shell. The pin and geometry with respect to an imaginary cylinder being coaxial to the internal surface of the shell in accordance with this invention is the same as described above in connection with the pinned shaft. The preferred embodiments referred to above apply to this pinned shell also.

In accordance with yet another embodiment of this invention, there is provided a carbon black pelleter.

This carbon black pelleter comprises a housing with a cylindrical internal surface and a pinned shaft rotationally and coaxially arranged within this shell. Furthermore, the carbon black pelleter comprises means for introducing flocculent carbon black into the space between the shell and the shaft, means for introducing pelleting fluid into this space and means for withdrawing carbon black pellets from this space. The pins on the shaft in accordance with this invention are arranged in the geometry defined above and the preferred arrangement of the pins explained apply to the carbon black pellet of this invention as well.

A still further embodiment of this invention resides in carbon black pelleter which consists in a pinned shell as defined above with a shaft concentrically arranged therein. Driving means are provided for the relative rotation of the shell and the shaft with respect to each other. With the pins affixed to a central shaft, the shaft and/or the shell can be rotated; preferably the pinned shaft is rotated. When the pins are affixed to the shell, the shell is rotated.

Yet another embodiment of this invention is a process for making a pinned shaft as defined in accordance with this invention. In this process, a first set of pins is attached to the shaft. The set of pins comprises one or more pins. Thereafter, a plurality of sets of pins with identical location with respect to each other is attached to the shaft, each set having the same axial and angular distance from the preceding and the following set. The pattern of each set of pins as well as the axial and angular distance between the sets of pins is selected so that the pin geometry is as defined above. In addition, two end sets of pins are attached to the shaft so that the entire pattern of pins on the shaft is essentially cylindrical. The relative position of the pins of these two end sets with respect to each other as well as with respect to pins of the plurality of identical sets of pins is the same as that defined above.

In accordance with a preferred embodiment of this process, the shaft is arranged in a mounting device in which the shaft can be moved axially in stepwise increments and can be rotated around its axis in stepwise increments past pin attachment stations for attaching the identical sets of pins to the shaft. After the first set of pins has been attached to the shaft, the shaft is moved axially by an increment defined in the following and is rotated angularly around its axis by an angle increment that is also to be defined in the following. Then, a second set of pins is attached to this shaft, the relative position of the pins being identical to the first set. This procedure is repeated a plurality of times. Remaining areas of the shaft that have to be pinned in order to give the pin shaft an essentially cylindrical configuration are then provided with the pins utilizing preferably the same pin attachment station but attaching only the missing pins to complete the cylindrical configuration.

The following description of the drawing illustrates further preferred embodiments of the invention but is not intended to unduly limit the scope thereof.

FIGS. 1 and 2 schematically show partially in cross section a carbon black pelleter. A hollow shaft 1 is rotatably and coaxially arranged within a housing 2. The shaft 1 is provided with a plurality of pins 3 extending radially outwardly from the shaft 1 in the proximity of the cylindrically shaped internal surface of the housing 2. Through an inlet 4, flocculent carbon black can be introduced into the annular space between the shaft 1 and the housing 2 and correspondingly pelleting fluid can be introduced through an inlet means 5 into this same annular space. At the upstream end of the shaft 1, the latter is provided with a flight 6. Downstream of this flight 6, the shaft 1 is provided with a plurality of pins 3 in a particular geometrical pattern in accordance with this invention that is to be described in detail in connection with the following figures. Only a few pins 3 have been shown in the FIGS. 1 and 2, but it is apparent that a cylindrical section of the shaft 1 of about a length of twice its diameter is provided with these pins 3. At the downstream end, the pelleter is provided with outlet means 7 for the removal of wet carbon black pellets from the annular space defined. The housing 2 is arranged on supports 8 and 9. A motor 10 is connected to the shaft 1 to rotate the pinned shaft.

The pin arrangement with respect to an imaginary cylinder having the radius r and being concentric with the shaft 1 is described in the following. This imaginary cylinder has a radius between the radius of the external surface of the shaft 1 and the internal surface of the housing 2. Generally, the radius of this imaginary cylinder will be the average between these two radii. The traces of the pins on the imaginary cylinder when rolled into a plane are shown in FIG. 3. The traces 31 of the pins 3 are shown in FIG. 3 as a pattern of identical squares. The imaginary cylinder has been cut open along a line 11 that is parallel to the shaft longitudinal axis and that constitutes the two parallel edges of the rectangle shown in FIG. 3. In accordance with this invention, it is important to note that none of the sides of a square unit of traces 31 is parallel to this line 11 nor is this line 11 arranged to be 45° to any side of a unit square.

As shown in FIG. 4, the arrangement of pins is such that seven squares and five squares, respectively, for the side of a triangle with an angle of 90° between them, the hypothenuse being the circumference $2\pi r$ of the imaginary cylinder. The pattern of pin traces 31 can be described as m helices (m=5 in the specific examples shown in FIGS. 3 and 4) having an inclination of $90° - \alpha$.

As indicated above, values a (the length of the side of the square of traces 31) and r (radius of the imaginary cylinder) cannot be independently selected. Rather, with the integers n and m preselected, any given value of a results in a single value r or vice versa any given value r results in a single value a. The algebraic relationship between a, r, n and m is given in the formula tabulation below.

FIG. 4 shows an enlarged square of pin traces 31 in order to explain certain distances. The pattern of traces 31 as indicated above can be described as m helices 311. Within one helix 311, the individual traces 31 have an axial distance y from their neighbor and an angular distance B from their next neighbors. The axial distance between two next neighboring pin traces 31 of two different helices is x and the corresponding angular distance is A. In the formula tabulations given below, only the absolute values of x, y, B and A are given. It has to be kept in mind, however, that the angular distances A and B are to be measured in the opposite direction from each other whereas the axial distances x and y are to be measured in the same direction.

In FIGS. 5 and 6, a pin pattern of traces 31 is shown for the trace of the pattern of equilateral triangles. In this case the pattern of traces 31 can be looked at as a series of four helices 311 (m in this case is 4). n triangle sides (n in this case is 7) of the length a form one side of a triangle 74. The other side of this triangle 74 is formed by m (which in the specific example is 4) having also the length a. These two sides form an angle of 120°. The third side of the triangle 74 again is the circumference of the imaginary cylinder $2\pi r$. FIG. 6 similar to FIG. 4 in its left portion shows an enlarged section of the equilateral triangles explain the axial distances x and y as well as the angular distances A and B of next neighboring traces 31.

For the third pattern of equilateral hexagons, FIG. 5 shows the arrangement of the traces 31. As can be seen from the right portion of FIG. 5, the pattern of these traces 31 for the case of the equilateral hexagon is identical to that of the equilateral triangles shown in the left side of FIG. 5 and can be thought as obtained by leaving out the central pin in the center of the hexagon. It has to be emphasized, however, that whereas the integers n and m in the case of the pattern of equilateral triangles can be independently chosen, in the case of the equilateral hexagon utilizing the same pattern and leaving out the referred pin, these integers have to be of such a size that their difference n−m is a multiple of 3, i.e. 3, 6, 9 or 12, etc.

The equilateral triangles, hexagons and squares as can be seen in the drawing, fill or tesselate (tile) the entire area where pins are located. Thus the distances to all next neighbors for all pins are the same and the pin density is constant all over the cylinder.

For the following tabulation of formula, the following abbreviations are used:

a—length of side
r—radius of (imaginary cylinder
y—axial shift for adjacent pins in one helix
B (length)—circumferential shift for adjacent pins in one helix
B° (degrees)—circumferential shift for adjacent pins in one helix
x—axial shift between corresponding pins in adjacent helices
A (length)—circumferential shift between corresponding pins in adjacent helices.
A° (degrees)—circumferential shift of corresponding pins in adjacent helices.
n—integer of 2 more
m—integer (n>m)
w—abbreviation
α—angle between helix 311 and line 11 (parallel to longitudinal axis of shaft)

By elementary trigometric calculations, the following formula can easily be derived from FIGS. 4 and 6.

|   | Equilateral Triangle | Square |
|---|---|---|
| w | $w = \sqrt{n^2 m^2 + n \cdot m}$ | $w = \sqrt{n^2 + m^2}$ |
| a | $a = \frac{2\pi r}{w}$ | $a = \frac{2\pi r}{w}$ |
| sin α | $\sin \alpha = \frac{2n + m}{2w}$ | $\sin \alpha = \frac{n}{w}$ |
| cos α | $\cos \alpha = \frac{m\sqrt{3}}{2w}$ | $\cos \alpha = \frac{m}{w}$ |
| y | $y = 2\pi r \cdot \frac{m}{w^2} \cdot \frac{r\sqrt{3}}{2}$ | $y = 2\pi r \cdot \frac{m}{w^2}$ |
| B° | $B° = 360° \cdot \frac{2n + m}{2w^2}$ | $B° = 360° \cdot \frac{2n + m}{w^2}$ |
| x | $x = 2\pi r \cdot \frac{n}{2w^2} \cdot \frac{\sqrt{3}}{2}$ | $x = 2\pi r \cdot \frac{n}{w^2}$ |

|   | Equilateral Triangle | Square |
|---|---|---|
| A° | $A° = 360° \cdot \frac{2m + n}{2w^2}$ | $A° = 360° \cdot \frac{2m + n}{2w^2}$ |

In order to produce a pinned shaft and after having selected the desired pattern, namely either equilateral triangle or square or equilateral hexagon, the procedure is as follows:

Step 1: Values for r, n and m as well as for the length of the pinned shaft are selected.

Step 2: The four values x, y, A° and B° are calculated from the above-given formula.

Step 3: A number of m pins are attached to the shaft, the axial distance between them being x and the angular distance between them being A°. After the shaft with the first set of pins is shifted axially by a distance of y and is rotated angularly by an angle of B° in the opposite direction as compared to the angle A°. Thereafter a second set of m pins identical to the first set in their relative position is affixed to the shaft. This procedure is repeated as often as necessary in order to cover the length 1 desired and the missing pins for an approximate cylindrical pattern at the two ends of the pinned area are finally attached. This procedure is straightforward and involves only two different axial movements and two different angular movements which are repeated throughout the entire pin application procedure.

As explained earlier, it is important that the two integers m and n have different values. Preferably, the two numbers n and m have no multiplicator in common. In this case, no circle around an imaginary cylinder exists that contains more than one pin trace center 31. If n and m both can be divided, for instance, by 2, then there will always be two pins arranged on one circle 180° apart. Similarly, if both n and m can be divided by 3, three pins are always arranged on one circle 120° apart, etc., In case m equals 1, the arrangement is that of a single helix, and a double helix correspondingly is achieved by selecting m=2.

The pin arrangement described achieves a completely symmetrical arrangement of the pins across the shaft while at the same time avoids essentially completely any alignment of pins in either axial direction or in circumferential direction.

In the following table, specific values for the angle B° and the distance a for a pin geometry of equilateral triangles on a 10 inch radius imaginary cylinder and a single helix arrangement (m=1) is given.

| n | B° | a (inches) |
|---|---|---|
| 6 | 54.4 | 9.58 |
| 7 | 47.4 | 8.32 |
| 8 | 41.9 | 7.35 |
| 9 | 37.6 | 6.59 |
| 10 | 34.2 | 5.96 |
| 11 | 31.2 | 5.45 |
| 12 | 28.8 | 5.01 |
| 13 | 26.6 | 4.64 |
| 14 | 24.8 | 4.32 |
| 15 | 23.2 | 4.05 |
| 16 | 21.8 | 3.80 |
| 17 | 20.5 | 3.59 |
| 18 | 19.4 | 3.39 |
| 19 | 18.5 | 3.22 |

In this specific example given above the shaft diameter is for example 19 inches and the pin length is 2 inches. Correspondingly, the internal diameter of the housing in case of a carbon black pelleter with such a pinned shaft is 23 inches.

The materials from which the shaft, the pins and the shell or housing of a mixer are made depends upon the materials and conditions such a mixer is subjected to. In the case of a carbon black pelleter, for instance, shaft housing and pins preferably are made out of stainless steel.

Reasonable variations and modifications which become apparent to those skilled in the art can be made in this invention without departing from the spirit and scope thereof.

We claim:

1. In a pinned shaft useful for mixing devices having a plurality of pins extending essentially radially outwardly from an essentially cylindrical shaft, the improvement of arranging the pins with respect to an imaginary cylinder having the shaft axis as its cylinder axis and having a radius so that the imaginary cylinder intersects the pins with the centerpoints of the intersections of the pins and the imaginary cylinder being arranged on a pattern of identically repeating units selected from the group of equilateral triangle, square and equilateral hexagon with the further provision that none of the sides or diagonals of the equilateral triangular patterns or the square patterns or the hexagonal patterns of pin placement are parallel to the axis of the imaginary cylinder.

2. A pinned shaft in accordance with claim 1 wherein the units are arranged in a line sequence of single, double, or triple helix.

3. A pinned shaft in accordance with claim 1 wherein the distance between the closest points on the imaginary cylinder is at least about 0.2 time the radius of the imaginary cylinder.

4. A pinned shaft in accordance with claim 1 wherein the units are equilateral triangles having a side length a that is related to the radius r of the imaginary cylinder by the relation $$a = 2\pi r / \sqrt{m^2 + m^2 + m \cdot n}$$

wherein n and m are positive integers different from each other.

5. A pinned shaft in accordance with claim 1 wherein the units are square having a side length a that is related to the radius r of the imaginary cylinder by the relation $$a = 2\pi r / \sqrt{n^2 + m^2}$$

n and m being positive integers different from each other.

6. A pinned shell useful for mixing devices having an elongated essentially cylindrical internal surface with a plurality of pins extending essentially radially inwardly from said cylindrical internal surface and having a pin geometry with respect to an imaginary cylinder having the shell axis as its cylinder axis, which pin geometry by means of the location of the centerpoints of the intersections of the pins and the imaginary cylinder is the same as defined in claim 1.

7. A carbon black pelleter comprising
   (a) a housing with a cylindrical internal surface,
   (b) means for introducing flocculent carbon black into said housing;
   (c) means for introducing a pelleting flid into said housing,
   (d) means for withdrawing carbon black pellets from said housing,
   (e) a pinned shaft arranged coaxially and rotationally within said housing, said pinned shaft having the pins arranged on the shaft as defined in claim 1, with the further provision that the unsupported, free ends of the pins extend into close proximity with the cylindrical internal surface of the housing, and
   (f) driving means for rotating said pinned shaft within said housing.

8. In a process for producing a pinned shaft the improvement of attaching pins having the lengths 1 to an essentially cylindrical shaft having a radius s in a pattern in which the intersections of the pins with an imaginary cylinder having a radius between s and s+1 are such that these intersections with the imaginary cylinder rolled into a plane form a pattern of identically repeating units selected from a group consisting of equilateral triangle, sqare and equilateral hexagon, with the further provision that none of the sides or diagonals of the equilateral triangular patterns or the square patterns or the hexagonal patterns of pin placement are parallel to the axis of the imaginary cylinder.

9. A process in accordance with claim 8 wherein
   (a) said shaft is arranged in an initial position in a mounting device in which the shaft can be moved axially by incremental steps y and can be rotated angularly in increments of B° passed a pin attachment station for attaching a set of m pins,
   (b) attaching a first set of m pins to said shaft,
   (c) moving said shaft with the first set of m pins axially by a distance y and angularly by an angle B° as defined in the formula given in the specification,
   (d) attaching a second set of m pins to said shaft, said second set of pins being identical in the relative pin position to the first set of pins,
   (e) repeating the steps (c) and (d) sequentially until the complete number of set of m pins has been attached to the shaft,
   (f) attaching final pins to the shaft for completing the essentially cylindrical arrangement of the pins on the shaft.

10. A process in accordance with claim 8 wherein said first set of pins comprises m pins that are arranged in a helical configuration having the axial distance x between adjacent pins and the angular distance of A° between adjacent pins in the opposite rotational sense as compared to the angle B°.

* * * * *

UNITED STATES PATENT AND TRADEMARK OFFICE
CERTIFICATE OF CORRECTION

PATENT NO. : 4,166,722

DATED : September 4, 1979

INVENTOR(S) : Bernhard H. Geissler and Paul D. Hann

It is certified that error appears in the above-identified patent and that said Letters Patent are hereby corrected as shown below:

Column 7, line 49, "square" should be --- squares ---.

Column 8, line 7, ";" should be --- , ---, line 8, "flid" should be --- fluid ---.

Signed and Sealed this

Fourth Day of December 1979

[SEAL]

Attest:

SIDNEY A. DIAMOND

Attesting Officer       Commissioner of Patents and Trademarks